(12) United States Patent
McAlister

(10) Patent No.: US 9,195,546 B1
(45) Date of Patent: Nov. 24, 2015

(54) ROTATING INCREMENTAL DATA BACKUP

(75) Inventor: Grant Alexander McAlister, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1471 days.

(21) Appl. No.: 12/043,749

(22) Filed: Mar. 6, 2008

Related U.S. Application Data

(63) Continuation of application No. 11/555,077, filed on Oct. 31, 2006, now abandoned.

(51) Int. Cl.
*G06F 17/30* (2006.01)
*G06F 11/14* (2006.01)

(52) U.S. Cl.
CPC .................................. *G06F 11/1451* (2013.01)

(58) Field of Classification Search
CPC .................................................... G06F 11/1451
USPC ............................................................ 707/646
See application file for complete search history.

(56) References Cited

U.S. PATENT DOCUMENTS

| | | | |
|---|---|---|---|
| 7,047,300 B1 * | 5/2006 | Oehrke et al. | 709/226 |
| 2002/0049778 A1 * | 4/2002 | Bell et al. | 707/200 |
| 2002/0065919 A1 * | 5/2002 | Taylor et al. | 709/226 |
| 2003/0204609 A1 * | 10/2003 | Anderson et al. | 709/229 |
| 2006/0200505 A1 * | 9/2006 | Bhatia | 707/204 |

* cited by examiner

*Primary Examiner* — Syling Yen
(74) *Attorney, Agent, or Firm* — Robert C. Kowert; Meyertons, Hood, Kivlin, Kowert & Goetzel, P.C.

(57) ABSTRACT

A method for backing up a database includes identifying n portions of a database wherein each of the n portions is greater than 0% and less than 100% of the database. The method also includes performing a complete backup of a first 1/n portion of the database and performing an incremental backup on the remaining (n−1)/n portion of the database, and for each subsequent backup, performing a complete backup of a next 1/n portion of the database and performing an incremental backup on the remaining (n−1)/n portion of the database.

25 Claims, 7 Drawing Sheets

ROTATING INCREMENTAL DATA BACKUP

CROSS-REFERENCE TO RELATED APPLICATION

This application is a continuation of co-pending U.S. patent application Ser. No. 11/555,077, filed Oct. 31, 2006, the entire disclosure of which is hereby incorporated by reference herein for all purposes.

BACKGROUND

This invention relates generally to computer systems, and more particularly to methods and apparatus for backing up and restoring data.

To ensure data integrity and persistence, computer databases are backed up on a routine basis. Backing up large databases can, however, be lengthy and time-consuming.

At least one known database system attempts to reduce the resources needed for backing up databases by a system using full backups and partial backups. A full backup is performed at a selected interval. Between full backups, one or more partial backups are performed at more frequent intervals. For example, consider a system in which a full backup is performed every seven days, on successive Sundays, and a partial backup is performed each day from Monday through Saturday. Let us also suppose that 10% of the records in the database change each day, on average.

Partial backups can be incremental or cumulative. An incremental backup only requires a backup of records that change between successive backups. A cumulative backup requires a backup of all records that have changed since the last full backup. Statistically, substantially more memory space on whatever backup medium is used (tape, disk, etc.) as well as time is needed to perform each successive cumulative backup between pairs of full backups. On the other hand, incremental backups statistically do not require an increasing amount of space and time to perform.

Whether incremental or cumulative partial backups are performed, this known system for backup up databases has proven quite successful for small and medium-sized databases. However, there are scaling problems associated with this backup system for large (e.g., terabyte) databases. For example, to backup a large database system requires a spike in resources each time a full backup is performed, i.e., time, space, computing power, and network bandwidth has to be available to perform the full backup. This requirement can limit large system backups to specific times during the week, such as Sundays at 4 a.m., which may be the only time enough resources can be made available without interfering with normal business uses of the database. Also, depending upon when in a backup cycle a restore has to be done, restoring a system from backups may require a tedious process of restoring the last full backup and all incremental backups since the last full backup, or the last full backup and a (possibly very large) incremental backup. Moreover, if a network computer performs backups for several large databases on separate backup schedules, a large peak resource requirement may have to be provided for those times when full backups have to be performed for more than one of the databases.

BRIEF DESCRIPTION

In one aspect, a method for backing up a database is provided. The method includes identifying n portions of a database, wherein each of the n portions is greater than 0% and less than 100% of the database, performing a complete backup of a first 1/n portion of the database and performing an incremental backup on the remaining (n−1)/n portion of the database, and for each subsequent backup, performing a complete backup of a next 1/n portion of the database and performing an incremental backup on the remaining (n−1)/n portion of the database.

In one aspect, a computer-aided method to backup a database on a computer or computer network is provided. The method includes performing cycles of backups of the database wherein, each backup in a cycle includes a full backup of a portion less than all of the database. The full backup portion in each backup is selected so that full backup portions in each of the backups of a cycle do not overlap substantially and so that a plurality of consecutive backups no greater than a cycle is sufficient to restore the database to a state corresponding to the state of the database at the last of the consecutive backups.

In another aspect, an apparatus for backing up a database is provided. The apparatus includes a computer and a storage medium or media having stored therein the database. The computer is configured to perform cycles of backups of the database wherein each backup includes a full backup of a portion less than all of the database. The full backup of portions in each backup are selected so that a plurality of consecutive backups no greater than a cycle is sufficient to restore the database to a state corresponding to the state of the database at the last of the consecutive backups.

In another aspect, a computer readable medium or media having stored thereon instructions configured to instruct a computer to perform cycles of backups of a database is provided. Each backup includes a full backup of a portion less than the entire database. The full backup portions are selected so that a plurality of consecutive backups no greater than a cycle is sufficient to restore the database to a state corresponding to the state of the database at the last of the consecutive backups.

Figure 1:
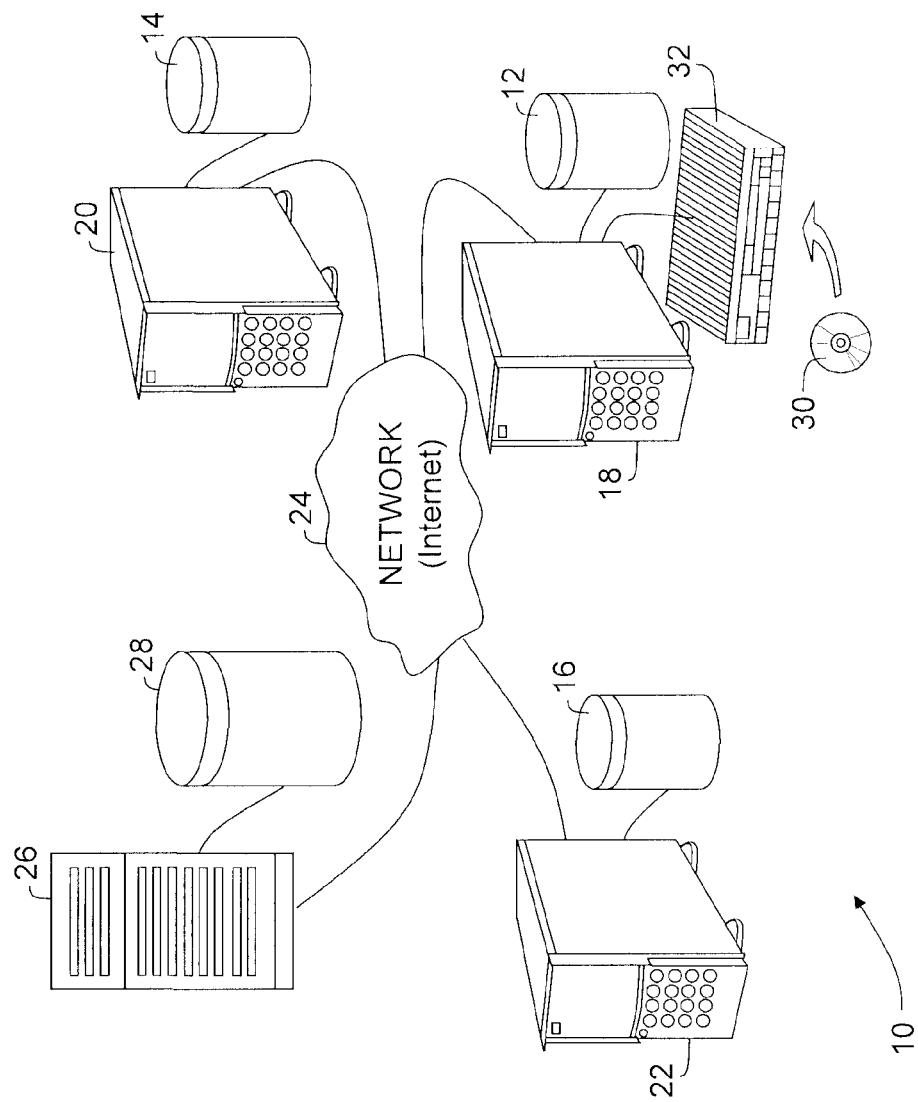
FIG. 1 is a block schematic drawing of an embodiment of the present invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. The various embodiments are not necessarily limited to the arrangements and instrumentality shown in the drawings.

DETAILED DESCRIPTION

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

In some configurations of the present invention, a method for using a computer or computers to backup up a database on a computer or computer network is provided. The method includes performing cycles of backups of the database, wherein each backup of the cycle includes a full backup of less than all of the database and a partial backup of the remainder of the database. (The entire database is thus backed up, one part in full, and one part partially, for each backup.) The full backup portions are selected so that a plurality of consecutive backups no greater than a cycle of backups is sufficient to restore the database to a state corresponding to the state of the database at the last of the consecutive backups. (The term "database" as used herein refers to any collection of data, and thus includes a greater scope than is usually afforded the term "database").

Technical effects of the present invention include the backing up and restoring of data on a computer or computer network, and/or the need for a lower level of peak resources for backing up data. Thus, another technical effect is the ability of a computer or computer network to back up a plurality of databases in an asynchronous fashion, without having to allow for the possibility of supplying enough resources to backup the entirety of all of the databases, should backup schedules collide in that manner.

More particularly, in some configurations of the present invention and referring to FIG. 1, an apparatus 10 for backing up data includes a computer 12 and a data storage medium or media 14 on which the database resides. Computer 10 is configured with software or firmware (e.g., 30, 32) to perform a method by which the database is backed up.

It should be understood that method configurations of the present invention can be performed for data 12, 14, and 16 stored on a plurality of computers 18, 20, and 22 on a computer network 24 and the method can further include transmitting backups of data 12, 14, and 16 to a server 26 on a computer network 24 on a large storage medium or media. In one embodiment, the network is the Internet. Alternatively, it may be any combination of the Internet, a local network, or a wide-area network. Backups of data 12, 14, and 16 at computers 18, 20, and 22 may occur independently and asynchronously of one another, so that the leveling of computer resources and loads provided by configurations of the present invention is particularly advantageous. The program or programs used to instruct any or all of computers 18, 20, and 22 to perform methods of the present invention may be instructions recorded on a machine readable medium or media 30, readable on an appropriate reading apparatus 32.

Figure 2:
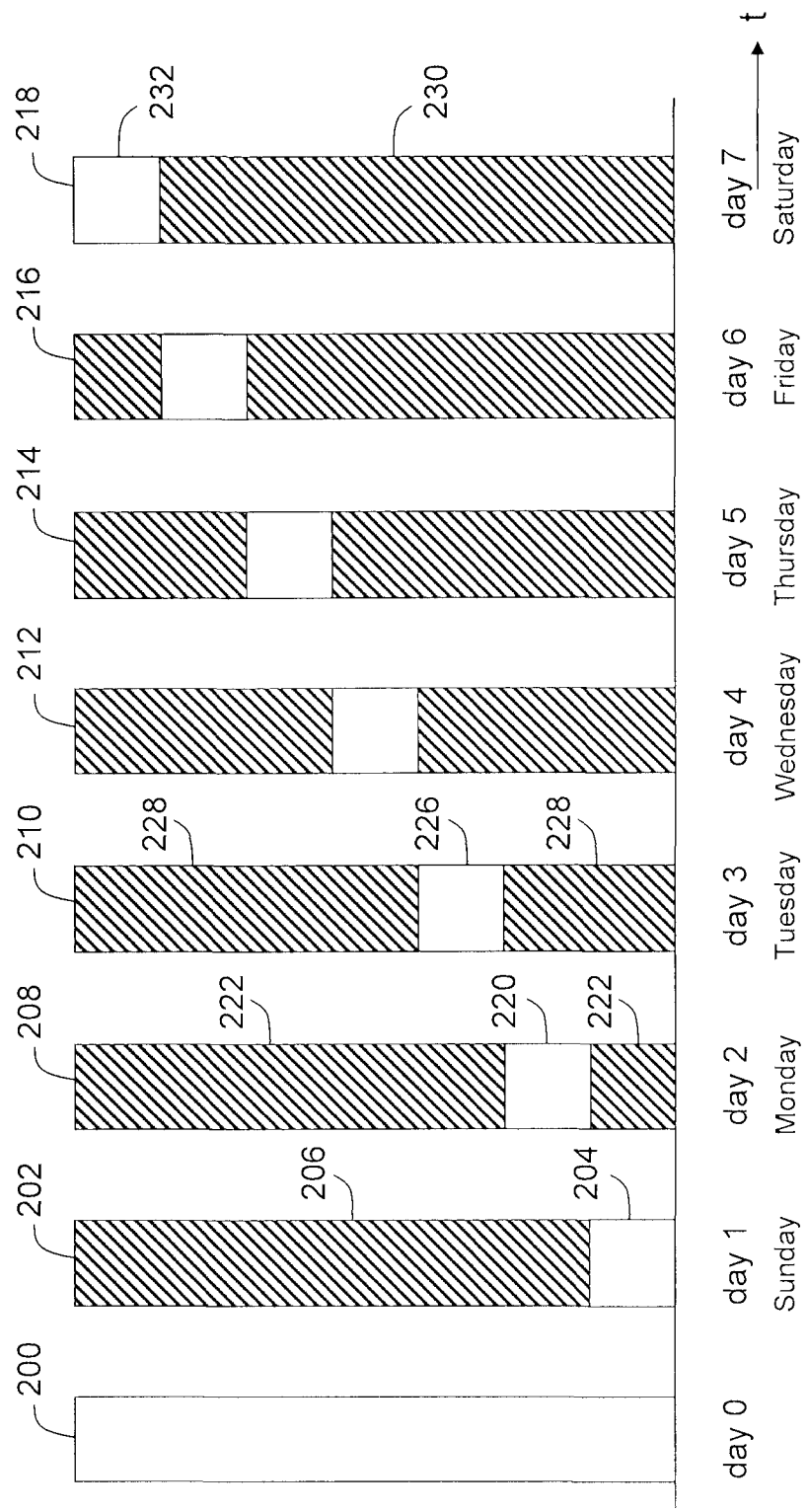
FIG. 2 is a chart illustrating an initial cycle of backups of a database made in one configuration of the present invention.

Referring now to FIG. 2, a backup 200 of the entire database is performed unless a suitable preexisting backup already exists. This first backup 200 (on "day 0") is intended to be used only until the first full cycle of backups is completed and is merely an initial artifact utilized for initializing configurations of the present invention. In an alternative embodiment, a backup of the entire database is not performed.

Figure 4:
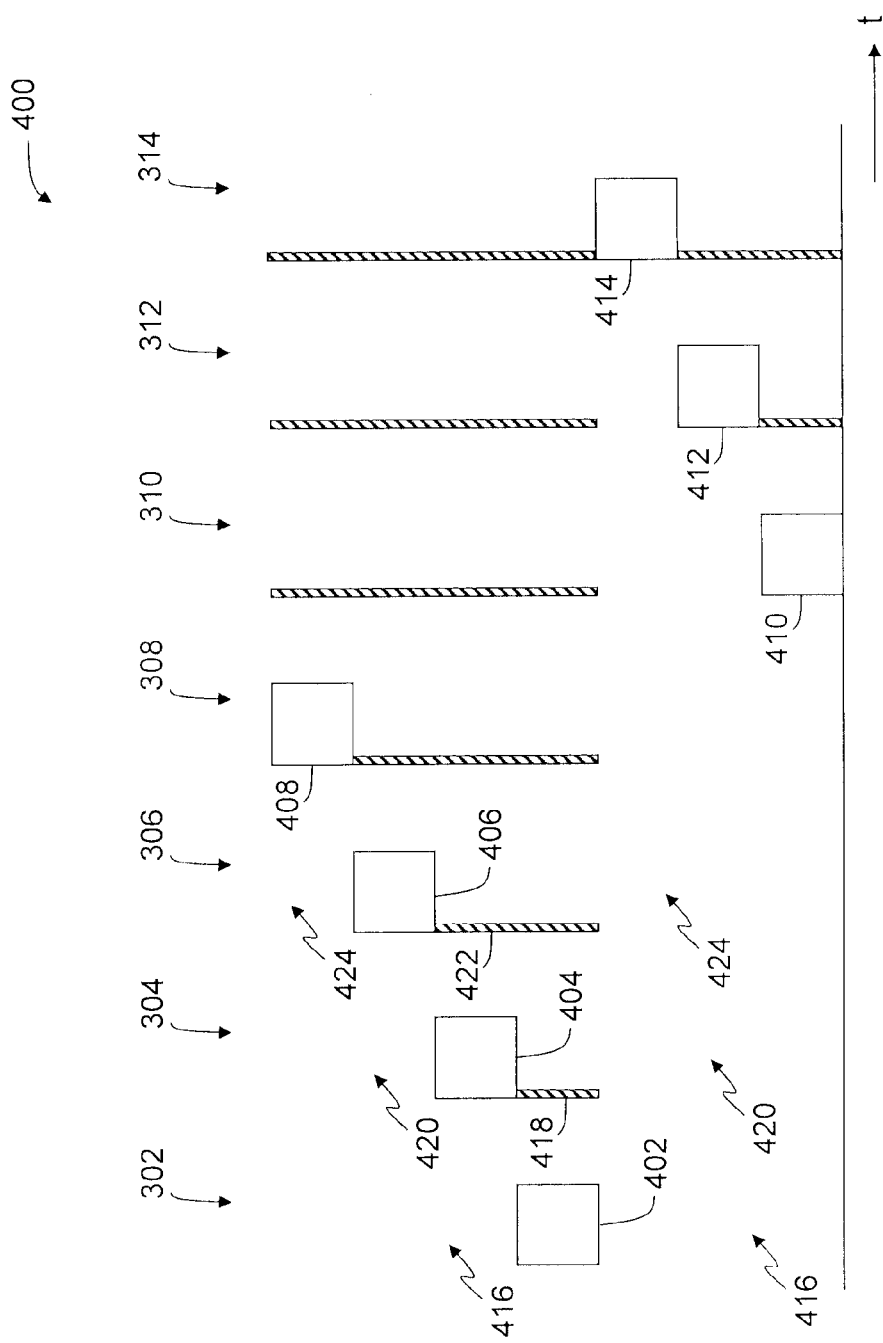
FIG. 4 is a chart illustrating how the cycle of backups in FIG. 3 can be used to restore the database using an incremental backup method.
Figure 5:
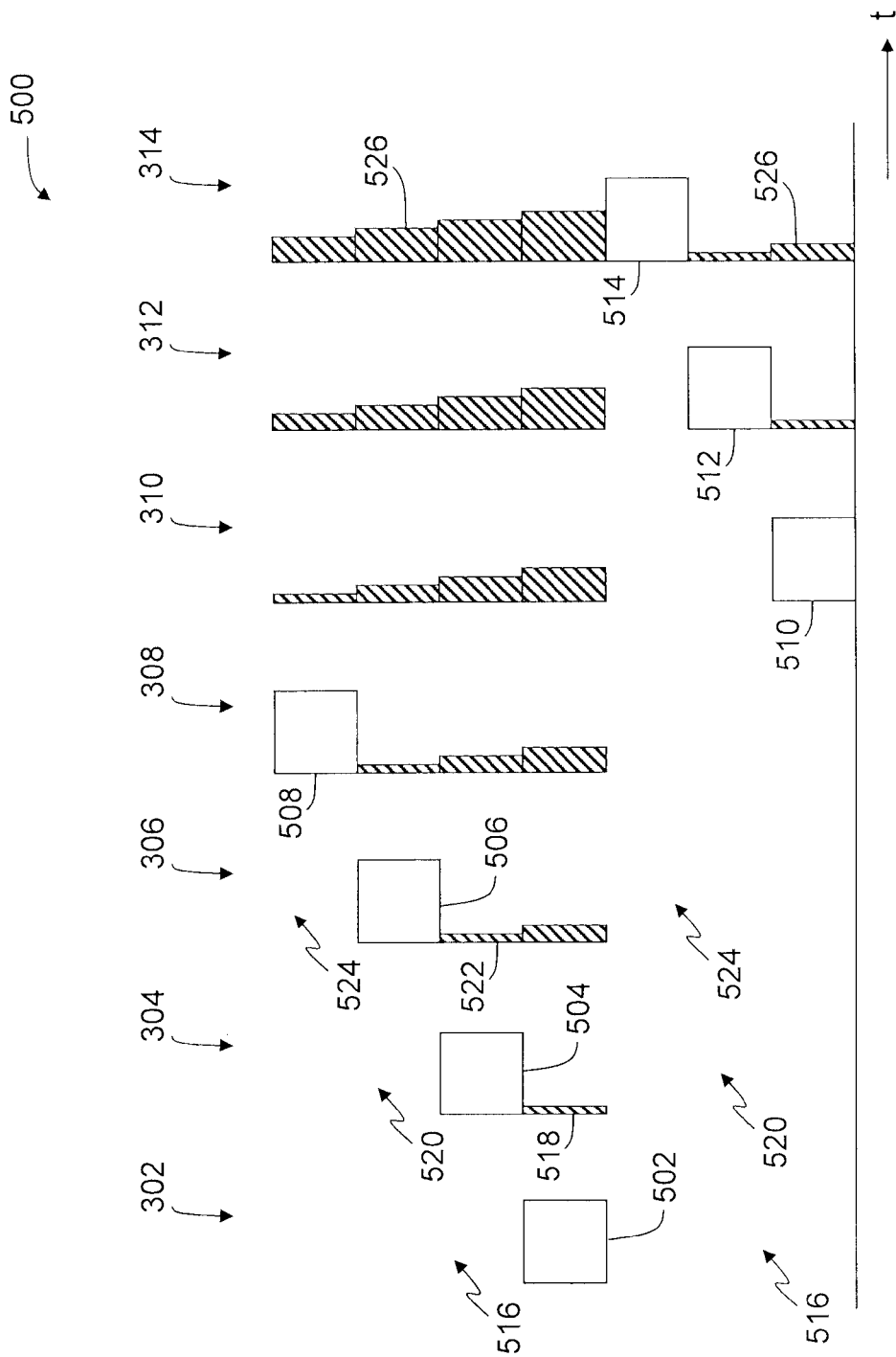
FIG. 5 is a chart illustrating how the cycle of backups in FIG. 3 can be used to restore the database using a cumulative backup method.

As the database is used, some of the records therein will change. Let us assume that a fraction of approximately q of the records in the database are changed each day, where q is between 0% and 100%, and that backups are performed daily, with N days constituting a complete cycle of backups. For the sake of the present example, let us assume that q=10% and that N=7. Thus, in some configurations of the present invention, a backup 202 on day 1 is performed. Backup 202 is a full backup of 1/N of the entire database plus a partial backup of (N−1)/N of the remainder of the database. Without loss in generality, suppose that first backup 202 is performed on a Sunday. Referring to FIG. 2, Sunday's backup 202 is represented by a full backup of a 1/7 portion 204 of the entire database plus a partial backup of the remaining 6/7 portion 206 of the entire database. Portion 206 can be either an incremental or cumulative partial backup. It should be noted that the partial backup portions represented in FIG. 2 are not representative of the amount of resources needed to backup the database, but rather are intended only to be representative of the fact that 6/7 of the database is partially backed up. A more detailed description of the specific partial backups is shown in FIGS. 4 and 5.

After at least the day 1 backup 202 is complete, the database may require restoration if an anomaly occurs that results in a loss of data before day 2 backup 208 is performed on Monday. If this data loss occurs before the first complete cycle of backups 202, 208, 210, 212, 214, and 216 has completed, all of the backups completed thus far, including, in one embodiment, the day 0 backup 200, are used to restore the database. The use of day 0 backup 200 in this context is merely an artifact of initializing the method. However, after the first complete cycle of backup has been completed and for all time thereafter, only the most recent N backups are utilized and all previous backups can be kept or discarded, as desired.

For each successive backup, the backup process cycles to the next fraction of data i.e., the day 2 backup 208 on Monday backs up the next 1/N portion 220 of the database, while performing a partial backup of the remaining (N−1)/N portion 222 of the database. The same can be said of day 3 backup 224, 1/N portion 226, and (N−1)/N portion 228. Each successive day rotates the 1/N portion of the database that is fully backed up, and eventually, the backup system is fully "primed" by day 7 in this example which includes partial backup portion 230 and full backup portion 232.

Figure 3:
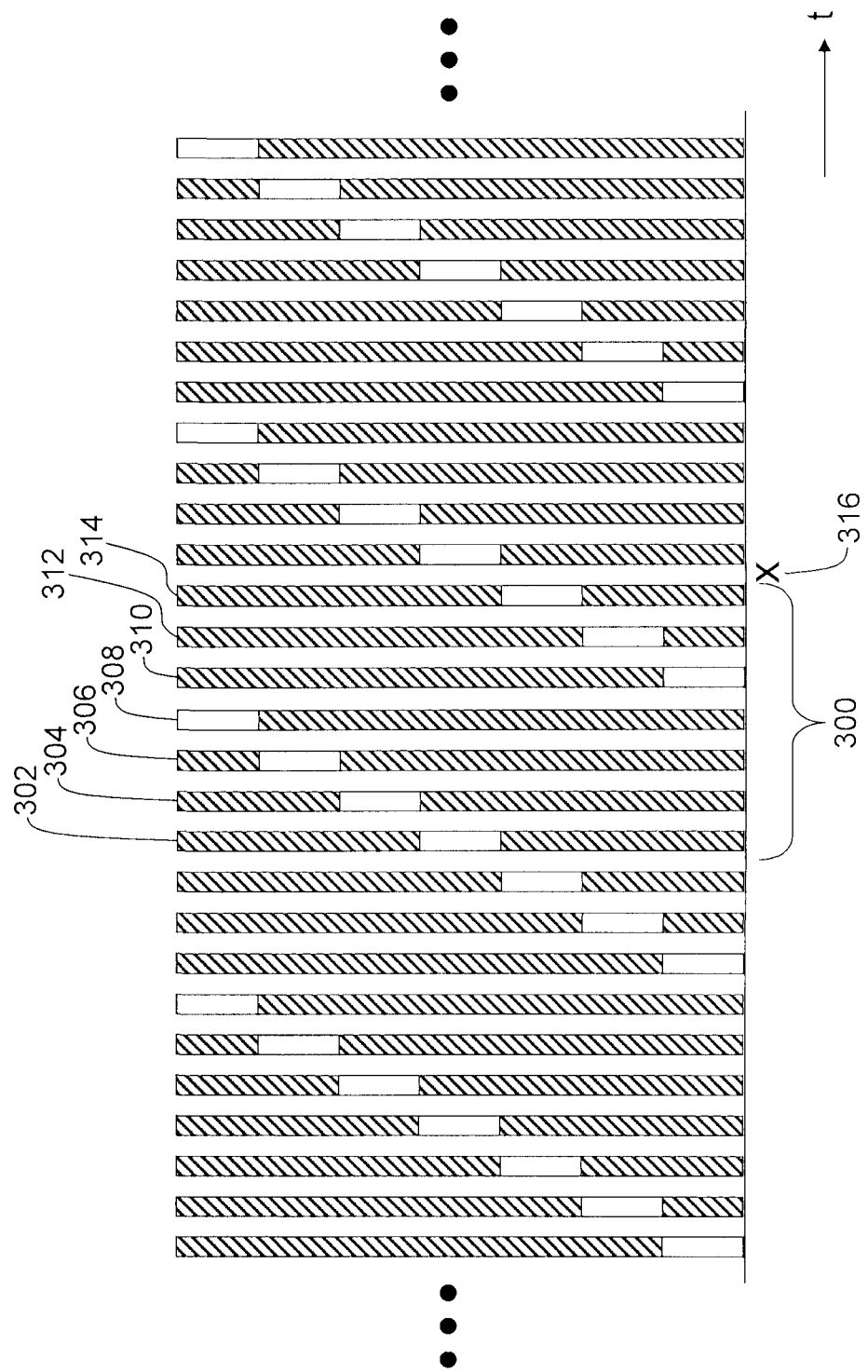
FIG. 3 is a chart illustrating a cycle of backups of a database at a time after the first cycle of backups has completed, showing the backups used to restore a database should a fault occur at a particular time.

For example, and referring to FIG. 3, a backup set 300 consisting of, in this case, backups 302, 304, 306, 308, 310, 312, and 314 are required to restore the full database if the database is corrupted or lost at a point 316. Depending upon the time at which the restoration of the database is performed, an appropriate backup set similar to set 300 is used to restore the database after the first cycle of backups is completed. It should be noted that the partial backup portions represented in FIG. 3 are not representative of the amount of resources needed to backup the database.

Referring now to FIGS. 4 and 5, once the system is "primed," restoring the database at point 316 requires only a backup set 300 (shown in FIG. 3) consisting of no more than the previous N backups. The size of the bars representing partial backups in FIGS. 4 and 5 are relative to the amount of resources needed to conduct a backup of the database. Specifically, FIG. 4 illustrates an incremental backup utilized by the system. A set 400 of backed up data is all that is required to completely restore the database. Only a full backup portion 402 of backup 302 is required, because full backups of portions 404, 406, 408, 410, 412, and 414 are available in subsequent backups 304, 306, 308, 310, 312 and 314, respectively. Therefore, the "partial" portion of backup 302 (indicated by empty areas 416) need not be used for restoring data, although no harm is done if partial portion 416 is used. Backup 304 need only be used to the extent of full backup portion 404 and partial backup portion 418 (which corresponds to the amount of resources needed to conduct a backup). A remaining partial backup portion 420 corresponding to full backups of portions 406, 408, 410, 412, and 414 available in subsequent backups 306, 308, 310, 312, and 314 need not be used at all, although no harm is done if backup portion 420 is used. Backup 306 need only be used to the extent of full backup portion 406 and partial backup portion 422 corresponding to the updates to full backup portions 402 and 404 of backups 302 and 304, respectively. A remaining portion 424 corresponding to full backups of portions 408, 410, 412, and 414 available in subsequent backups 308, 310, 312, and 314 need not be used at all. Backups 308, 310, 312, and 314 are used in a similar way, in that only the full backup portions plus that part of the partial backup portion corresponding to full backup portions present in previous backups need be used.

FIG. 5 illustrates a cumulative backup utilized by the system. In such a cumulative backup system, a set 500 of backed up data is all that is required to completely restore the database. Only a full backup portion 502 of backup 302 is required, because full backups of portions 504, 506, 508, 510, 512, and 514 are available in subsequent backups 304, 306, 308, 310, 312 and 314, respectively. Therefore, the "partial" portion of backup 302 (indicated by empty areas 516) need not be used for restoring data, although no harm is done if partial portion 516 is used. Backup 304 need only be used to the extent of full backup portion 504 and partial backup portion 518 corresponding to the updates to full backup portion 502 of backup 302. A remaining partial backup portion 520 corresponding to full backups of portions 506, 508, 510, 512, and 514 available in subsequent backups 306, 308, 310, 312, and 314 need not be used at all, although no harm is done if backup portion 520 is used. Backup 306 need only be used to the extent of full backup portion 506 and partial backup portion 522 corresponding to the updates to full backup portions 502 and 504 of backups 302 and 304, respectively. A remaining portion 524 corresponding to full backups of portions 508, 510, 512, and 514 available in subsequent backups 308, 310, 312, and 314 need not be used at all. Backups 308, 310, 312, and 314 are used in a similar way, in that only the full backup portions plus that part of the partial backup portion corresponding to full backup portions present in previous backups need be used. Accordingly, for a cumulative system, only the full backup portions 502, 504, 506, 508, 510, 512, and 514 plus the cumulative partial backup portion 526 of the final backup 314 are required for restoring the full database.

Figure 6:
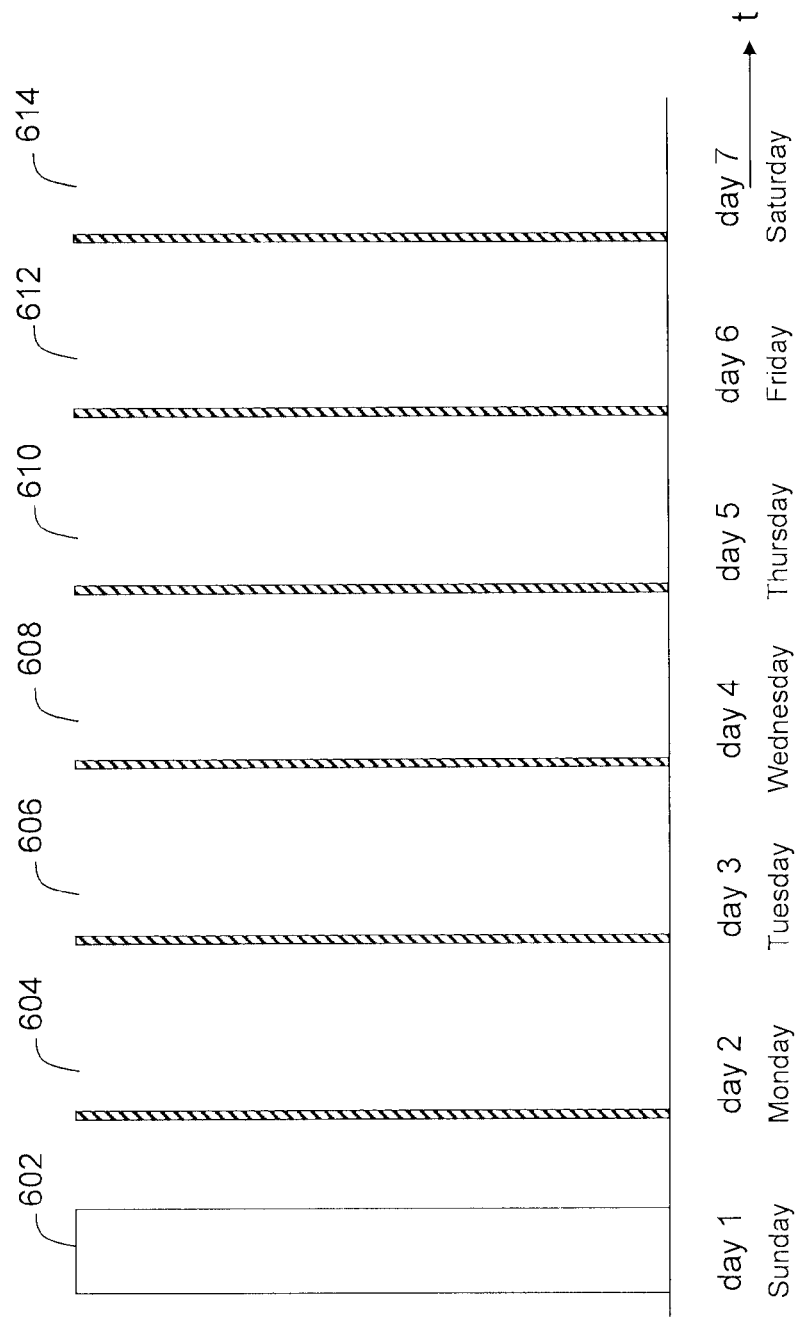
FIG. 6 is a representation of a prior art method for incrementally backing up a database.

For comparison with the incremental backup method described above, consider the known prior art backup method represented in FIG. 6, where a full backup 602 is performed, followed by N partial incremental backups 604, 606, 608, 610, 612, and 614, after which, the cycle repeats. Full backup 602 is a 100% backup of the database. Full back up 602 is utilized for the first backup and may not be required thereafter. Instead, some configurations of the present invention require a full backup of only 1/N of the entire database plus a partial incremental backup of (N−1)/N of the database in each of the N backups of a cycle. For a 20 terabyte database, if the fraction of records q of the database that change between backups is 10%, for example, the total fraction of the database that must be backed up in these configurations of the present invention is $(1/N)+0.1(N-1)/N=(0.1N+0.9)/N$. For N=7, as is the case in the present examples, this fraction is 1.6/7, or slightly less than 23% of the database (which represents 4.6 terabytes of data). The total amount of the database that is backed up over a cycle is 160% of the database (which represents 32 terabytes of data) in these example configurations of the present invention. By contrast, in the prior art example of FIG. 6, full backup 602 requires backing up 100% of the database (which represents 20 terabytes of data) for one backup of a cycle and 10% of the database (which represents 2 terabytes of data) on the other backups of a cycle. The total amount of backup is also 160% (which represents 32 terabytes of data) in the example prior art configuration. However, more than four times as much bandwidth (20 terabytes of data compared to 4.6 terabytes of data), time, and resources must be made available to perform the one full backup than is required for any backup in the cycle of the example configuration of the present invention. This high peak load may limit the times at which a full backup 602 can be scheduled for large databases. By contrast, the smaller backups of the example configuration of the present invention may allow backups to be run at more convenient times or even permit the use of larger databases.

Figure 7:
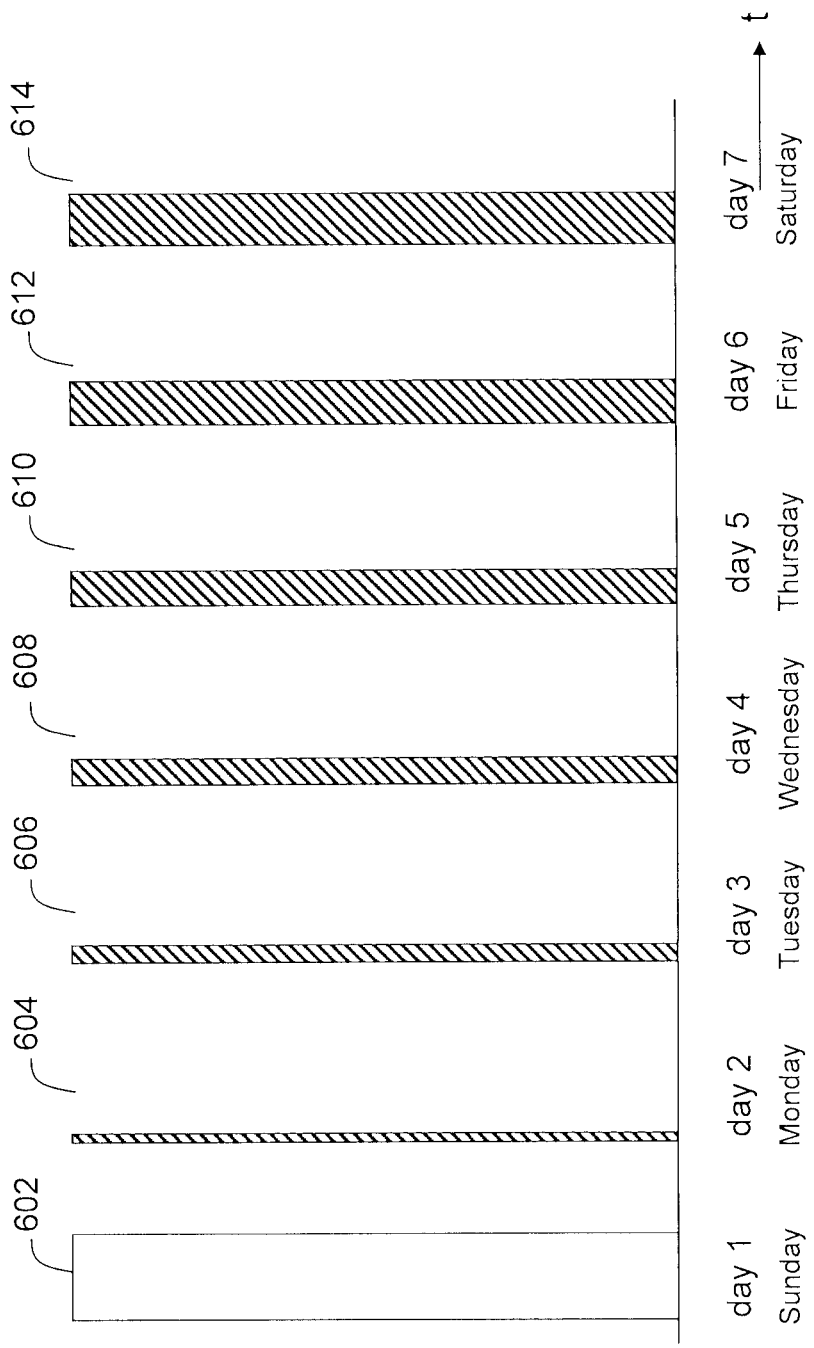
FIG. 7 is a representation of a prior art method for cumulatively backing up a database.

FIG. 7 represents a prior art example of cumulative partial backups 604, 606, 608, 610, 612, and 614. Comparison can thus be made between the present invention shown in FIG. 5 that illustrates cumulative partial backups for the partial portions of the cyclical backups and FIG. 7. Again, for a 20 terabyte database, if a fraction q of the database changes between backups, then the fraction of database that has changed since the last full backup in the prior art example of FIG. 6 is equal to $1-(1-q)^m$, where m is the number of the current cumulative backup in the cycle. Thus, if q=10%, backup 604 contains 10% of the data contained in backup 602 (which represents 2 terabytes of data), backup 604 contains 19% of the data contained in backup 602 (which represents 3.8 terabytes of data), backup 606 contains 27.1% of the data contained in backup 602 (which represents 5.42 terabytes of data), etc., up to backup 614, which contains about 46.9% of the data contained in backup 602 (which represents about 9.38 terabytes of data). By contrast, with the example configuration of the present invention shown in FIG. 2, each 1/N portion of the database in partial cumulative backup portion 230 is only cumulative of changes that have occurred since that 1/N portion was last backed up. Thus, cumulative backup portion 230 and full backup portion 232 together contain about 44% of the data contained in the database (which represents about 8.8 terabytes of data), as does every backup after backup 218. Therefore, except for the single backup 300 that may be performed at day 0, prior art methods utilizing cumulative incremental backups require more than twice the bandwidth (20 terabytes of data compared to 8.8 terabytes of data) of the configurations of the present invention described above that utilize cumulative partial backups, thus reducing the peak computing resource load needed. Restoring the database, in a configuration of the present invention utilizing cumulative partial backups, requires only the most recent N full backup portions of 1/N of the database plus the last cumulative partial backup.

Although the example method configurations of the present invention discussed above utilize full backup portions of 1/N of the database, this is a particularization of a more general method configuration of the present invention in which each backup includes a full backup of a portion less than all of the database, wherein each full backup portion in each backup in the cycle is selected so that the full backup portions in each backup of a cycle do not overlap substantially, and a plurality of consecutive backups no greater than a cycle is sufficient to restore the database to a state corresponding to the state of the database data at the last of the consecutive backups.

The terms "not overlapping," "not overlapping substantially," and other phrases referring to the same concept should be read as being synonymous for purposes of the present invention. Even though a large advantage is obtained by configurations in which no overlap occurs, the amount of advantage that is lost by using overlapping full backup portions is approximately proportional to the amount of overlap of the full backup portions. Thus, although generally less desirable, a small amount of such overlap can be tolerated in configurations of the present invention.

In some configurations of the present invention, the database may add new records or delete existing records and thus may change size during a backup cycle. To prevent added records from being lost and deleted records from being restored, some configurations of the present invention utilize metadata to determine the current size of the database. This metadata may include, for example, dates on which the record was changed, added, or deleted, and the length of the database itself.

It will be appreciated that some configurations of the present invention level out the maximum resources required to perform backups of large databases, particularly for databases large enough to be accurately characterized statistically. Configurations of the present invention are particularly useful for large commercial databases, which may, for example, be as large as 1 to 20 terabytes. Specifically, using the prior art method represented in FIG. 6, the server may be required at certain times to provide resources sufficient to fully back up all databases, whereas under the present invention, the maximum possible resource load can be made substantially less, allowing all backups to proceed.

In one aspect, some configurations of the present invention provide a computer-aided method for using a computer or computers to backup a database on a computer or computer network. The method includes performing cycles of backups of the database. Each of the backups in a cycle include a full backup of a portion less than all of the database, and the full backup portion in the backups are selected so that all the full backup portions of a cycle do not overlap substantially and a plurality of consecutive backups no greater than a cycle is sufficient to restore the database to a state corresponding to the state of the database at the last of the consecutive backups.

In another aspect, some configurations of the present invention provide an apparatus for backing up a database that includes a computer and a storage medium or media having stored therein the database. The computer is configured to perform cycles of backups of the database. Each of the backups includes a full backup of a portion less than all of the database, and the full backup portions are selected so that a plurality of consecutive backups no greater than a cycle is sufficient to restore the database to a state corresponding to the state of the database at the last of the consecutive backups.

In yet another aspect, some configurations of the present invention provide a computer readable medium or media having stored thereon instructions configured to instruct a computer to perform cycles of backups of a database. Each of the backups include a full backup of a portion less than all of the database, and the full backup portions are selected so that a plurality of consecutive backups no greater than a cycle is sufficient to restore the database to a state corresponding to the state of the database at the last of the consecutive backups While the invention has been described in terms of various specific embodiments, those skilled in the art will recognize that the invention can be practiced with modification within the spirit and scope of the claims.

What is claimed is:

1. A method for backing up a database, comprising:
   identifying n portions of a database, wherein each of the n portions is greater than 0% and less than 100% of the database, and wherein at least one portion of the n portions overlaps at least in part with another portion of the n portions;
   performing a complete backup of a first portion of the n portions of the database and performing less than a complete backup of one or more of the remaining portions of the database; and
   for each subsequent backup of a cycle comprising n successive backups, performing a complete backup of a next portion of the database and performing less than a complete backup of one or more of the remaining portions of the database, wherein performing a less than complete backup of one or more of the remaining portions of the database includes performing a backup of updates each of the one or more remaining portions have incurred since the last time each of the one or more remaining portions was completely backed up.

2. A method in accordance with claim 1 further comprising selecting a different portion of the n portions of the database for a complete backup in each of the n successive backups in the cycle.

3. A method in accordance with claim 2 further comprising restoring the database including restoring a cycle of backups.

4. A method in accordance with claim 2 wherein performing the less than a complete backup of one or more of the remaining portions of the database comprises performing a cumulative backup of the one or more of the remaining portions.

5. A method in accordance with claim 4 further comprising restoring the database including restoring each of the completely backed up portions of a cycle and a less than a complete backup portion that was saved in the last backup of the cycle.

6. A computer-aided method to backup a database on a computer or computer network, said method comprising performing at least one backup cycle comprising a plurality of backups of the database, each backup in the plurality of backups including a complete backup of a portion less than all of the database and a less than a complete backup of a remainder of the database, wherein performing a less than complete backup of the remainder of the database includes performing a backup of updates the remainder of the database has incurred since the last time the remainder of the database was completely backed up, wherein at least one portion less than all of the database that is completely backed up during a particular backup cycle overlaps at least in part with another portion that is completely backed up during the particular backup cycle.

7. A method in accordance with claim 6, wherein each portion less than all of the database that is completely backed up during the particular backup cycle is approximately equal in size to each of the other portions less than all of the database that are completely backed up during the particular backup cycle.

8. A method in accordance with claim 7 further comprising restoring the database including restoring each backup of the plurality of backups of the particular backup cycle.

9. A method in accordance with claim 7, wherein the particular backup cycle comprises n backups, wherein each of the portions less than all of the database that are completely backed up during the particular backup cycle comprises approximately 1/n of the database, further comprising:
   selecting a different portion comprising approximately 1/n of the database for each complete backup in the particular backup cycle, and wherein the less than a complete backup of the remainder of the database comprises a cumulative less than a complete backup.

10. A method in accordance with claim 9 further comprising:
restoring the database using n complete backups of approximately 1/n of the database and one less than a complete backup.

11. A method in accordance with claim 6 further comprising utilizing metadata to determine a current size of the database.

12. A method in accordance with claim 6 performed for data on a plurality of computers on a computer network, said method further comprising transmitting backups to a server on the computer network.

13. An apparatus for backing up a database, said apparatus comprising:
a computer; and
a storage medium or media having stored therein the database,
said computer configured to perform cycles of backups of the database, each said backup including a complete backup of a portion less than all of the database and a less than a complete backup of a remainder of the database, wherein performing a less than complete backup of the remainder of the database includes performing a backup of updates the remainder of the database has incurred since the last time the remainder of the database was completely backed up, and wherein at least one portion less than all of the database that is completely backed up during a particular cycle overlaps at least in part with another portion less than all of the database that is completely backed up during the particular cycle.

14. An apparatus in accordance with claim 13 wherein to perform a backup of the database, said apparatus is configured to perform a complete backup of approximately 1/n of the database and a less than a complete backup of the remainder of the database, where n is the number of backups in a cycle, and wherein the apparatus is further configured to select a different fraction approximately 1/n of the database for each complete backup in the cycle.

15. An apparatus in accordance with claim 13 wherein the computer is further configured to restore the database by restoring a cycle of backups.

16. An apparatus in accordance with claim 13 wherein the less than a complete backup of the remainder of the database comprises a cumulative less than a complete backup.

17. An apparatus in accordance with claim 16 wherein the computer is further configured to restore the database using n complete backups of approximately 1/n of the database and one less than a complete backup.

18. An apparatus in accordance with claim 17 further configured to utilize metadata to determine when a record was deleted from the database to exclude the record from a restored version of the database.

19. An apparatus in accordance with claim 13 further comprising a plurality of additional computers on a computer network including a server, said plurality of additional computers configured to transmit backups to the server on the computer network.

20. A non-transitory computer readable medium or media having stored thereon instructions configured to instruct a computer to perform cycles of backups of a database, each said backup including a complete backup of a portion less than all of the database and a less than a complete backup of a remainder of the database, wherein performing a less than complete backup of the remainder of the database includes performing a backup of updates the remainder of the database has incurred since the last time the remainder of the database was completely backed up, wherein said portions less than all of the database are selected so that a plurality of consecutive backups no greater than a cycle is sufficient to restore the database to a state corresponding to a state of the database at a last of the plurality of consecutive backups, and wherein at least one of said portions less than all of the database that is completely backed up during a particular cycle overlaps in part with another of said portions less than all of the database that is completely backed up during the particular cycle.

21. A non-transitory computer readable medium or media in accordance with claim 20 wherein to perform a backup of the database, said medium or media have recorded thereon instructions configured to instruct the computer to perform a complete backup of approximately 1/n of the database and a less than a complete backup of the remainder of the database, where n is a total number of backups in a cycle, and wherein said medium or media have recorded thereon additional instructions configured to instruct the computer to select a different fraction of approximately 1/n of the database for each complete backup in the cycle.

22. A non-transitory computer readable medium or media in accordance with claim 21 further having stored thereon instructions configured to instruct the computer to restore the database by restoring a cycle of backups.

23. A non-transitory computer readable medium or media in accordance with claim 21 wherein the less than a complete backup of the remainder of the database comprises a cumulative less than a complete backup.

24. A non-transitory computer readable medium or media in accordance with claim 23 further having stored thereon instructions configured to instruct the computer to restore the database by restoring a cycle of complete backups of 1/n of the database and a last less than a complete backup of the cycle.

25. A non-transitory computer readable medium or media in accordance with claim 20 further having instructions recorded thereon configured to instruct the computer to transmit backups to a server on a computer network.

* * * * *